July 29, 1969 M. T. DERBY 3,457,824
CAP NUT
Filed Sept. 14, 1967
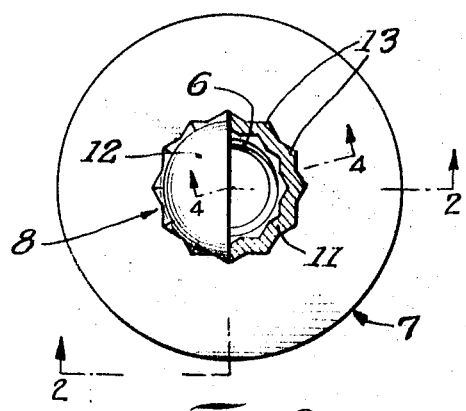
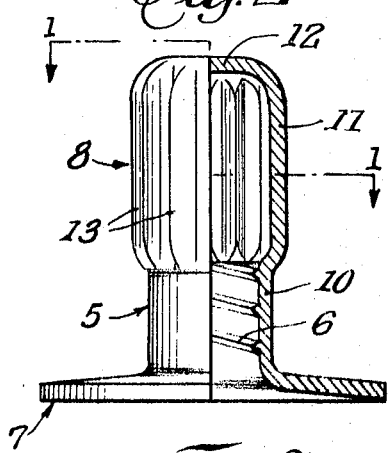
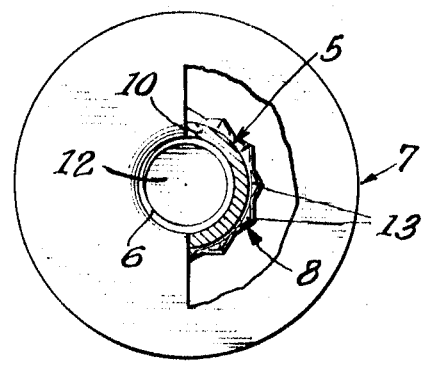
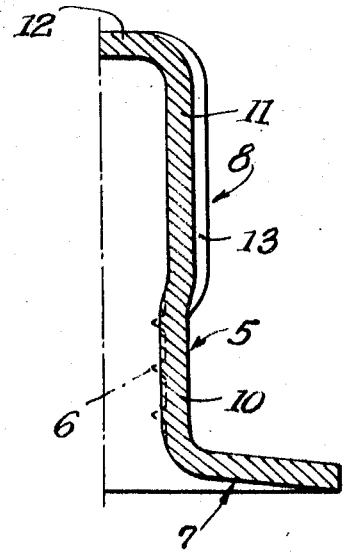
INVENTOR.
MARSHALL T. DERBY
BY C. G. Stratton
ATTORNEY United States Patent Office 3,457,824
Patented July 29, 1969

3,457,824
CAP NUT
Marshall T. Derby, Downey, Calif., assignor to California Industrial Products, Inc., Santa Fe Springs, Calif., a corporation of California
Filed Sept. 14, 1967, Ser. No. 667,752
Int. Cl. F16b 37/14, 39/22
U.S. Cl. 85—35                                    3 Claims

ABSTRACT OF THE DISCLOSURE

A cap nut formed of sheet metal and having an intermediate round-sectioned, internally threaded portion, a radial flange at one end of said portion, and an end-closed, fluted extension at the other end, the intermediate portion having a cylindrically tubular wall of uniform thickness and the threads therein being formed as continuous convolutions, and the flutes on the extension being longitudinal and axially offset beyond the threads.

Background of the invention

Conventional cap nuts, whether of solid or sheet metal stock with machined or rolled threads, have the outside torque-applying faces generally axially coextensive with the threads that are provided on the inside of the nut. In solid stock cap nuts, the roundness of the threads is not affected in any way by the polygonal form of the torque-applying outer side. However, in sheet metal cap nuts formed as by drawing the same into the cup-like form of such a nut, longitudinal coincidence of the threads and the polygonal outer form usually results in formation of a thread that is interrupted rather than desiredly continuous.

This invention has for an object to not only provide cap nuts formed of thin walls of uniform thickness, but also forms such nuts with continuously uninterrupted convolutions. Continuity of threads is impotrant to good thread engagement with the mating member in assembly, whether the threads are of the type to engage with a pre-threaded bolt, or to form threads on an unthreaded stud. Interruption of threads reduces the engagement area with the mating part, hence reducing the torque and tension value.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

Summary of the invention

The present cap nut comprises, generally, an intermediate portion 5 provided with an internal preferably thread-forming thread 6, a flange 7 on one end of the portion 5, and an end-closed fluted portion 8 diametrically internally larger than the portion 5 and extending from the other end of said portion 5. The above generally-described cap nut is advantageously formed of sheet metal, as by drawing the same in dies that form the walls thereof to be of substantially uniform thickness, and the threads 6, being formed on the inner face of the wall of the portion 5 in an operation performed after completion of the drawing operation and a subsequent operation constricting the side of the portion 5, as indicated above.

Brief description of the drawing

In the drawing, like reference characters designate similar parts in the several views.
FIG. 1 is a plan view of one end of the cap nut with a portion thereof in quarter section, as indicated by the line 1—1 of FIG. 2.
FIG. 2 is an elevational view in quarter section, as indicated by the line 2—2 of FIG. 1.
FIG. 3 is a partly broken plan view of the opposite end of the nut.
FIG. 4 is an enlarged vertical sectional view as taken on the line 4—4 of FIG. 1.

Description of the preferred embodiment

The intermediate portion 5 is cylindrcially tubular and, as shown in FIG. 4, has a cylindrical wall 10 which, before the thread 6 is formed thereon, has a thickness that approximates that of the flange 7. While the wall 11 of the portion 8 is shown as the same thickness, in practice, said wall will usually draw to be somewhat thinner. Said wall 11 ordinarily thins out towards the end wall 12, the latter wall, also thinning out, similarly. Part of this thinning of wall 11 is due to the formation of the flutes 13.

The foregoing describes a preferred manner of forming the present cap nuts, but whether the thicknesses of the walls 11 and 12 are as described is not material to the invention, only that the wall 10 be cylindrical. Also, although the preferred double-hexagon form of the flutes that is shown is preferred, other cross-sectional shapes of the flutes 13 may be used. Thus, the terms "flutes" or "fluted" as used in this specification and in the following claims are intended to include polygonal shapes, shapes with one or more flats, grooves, and the like.

It will be understood that the portion 5 of the nut is constricted to the indicated smaller size after the nut portion 8 is completed, and the male die part forming the latter portion has been removed, the constriction bringing the inner face of the wall 10 to a diametral size smaller than the inner diametral size of the fluted portion 8. Now, when the thread 6 is formed in said wall 10, the tool will leave a root diameter smaller than the smallest inner diameter of the extension portion 8.

The flange 7 is preferably dished, as shown, so the same will be placed in flexure when the nut is applied to form a thread and the outer edge of said flange bears against the member from which the stud or bolt on which the thread is formed extends. The nut is thereby fitted in operative position by a torque-applied operation.

The present nut is advantageously formed of SAE 1050 steel and, after formation, heat-treated to R/C 42–47 hardness. For nuts having an approximate thread size of one-quarter inch, the wall thickness of the steel, before formation of the nut, is in the nature of .028 inch. For larger sizes, the wall thickness may be proportionally increased, and for smaller sizes, may be decreased.

While the foregoing has illustrated and described what is now contemplated to be the best mode of carrying out the invention, the construction is, of course, subject to modification without departing from the spirit and scope of the invention.

Having thus described this invention, what is claimed and desired to be secured by Letters Patent is:
1. An integral sheet metal self-threading cap nut comprising:
   (a) a cylindrical tubular portion having an internal continuous spiral V-shaped cutting thread formed therein, with the adjacent convolutions being spaced apart,
   (b) an integral end-closed and fluted tubular portion extending from one end of said cylindrical tubular portion, the flutes thereon defining a polygonal cross-section for engagement by a tool, and (c) a dished resilient flange integral with the end of the cylindrical tubular portion opposite to the end from which the fluted portion extends, the outer peripheral edge thereof being adapted to bear against a member from which the part on which the thread of the nut is engaged extends, (d) the inner minimum diameter of the fluted tubular portion being larger than the inner diameter of the cylindrical tubular portion at the base of the thread, and the wall thickness of the cylindrical tubular portion from the outside to the crown of the thread being greater than the wall thickness of the fluted tubular portion.

2. A cap nut according to claim 1 in which the thickness of the flange is substantially the same as of the other portions of the nut.

3. A cap nut according to claim 1 comprising SAE 1050 steel heat treated, after formation, to R/C 42–47 hardness.

References Cited

UNITED STATES PATENTS

| | | | |
|---|---|---|---|
| 1,088,437 | 2/1914 | Moore | 85—32 |
| 1,309,616 | 7/1919 | Eisler | 85—32 |
| 1,486,448 | 3/1924 | Norlund | 85—32 |
| 1,957,282 | 5/1934 | Noyack | 85—32 |
| 2,734,547 | 2/1956 | Hotchkim | 151—38 |
| 1,736,379 | 11/1929 | Sommer | 85—35 |

EDWARD C. ALLEN, Primary Examiner

U.S. Cl. X.R.

151—38